(12) United States Patent
Atkins

(10) Patent No.: US 7,522,314 B2
(45) Date of Patent: Apr. 21, 2009

(54) IMAGE SHARPENING

(75) Inventor: Brian C. Atkins, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 828 days.

(21) Appl. No.: 10/742,532

(22) Filed: Dec. 19, 2003

(65) Prior Publication Data
US 2005/0135701 A1    Jun. 23, 2005

(51) Int. Cl.
*G06K 9/40* (2006.01)
(52) U.S. Cl. ..................... 358/3.27; 382/274
(58) Field of Classification Search ........... 382/254, 382/260, 263, 264, 266, 269, 274, 275; 358/3.26, 358/3.27
See application file for complete search history.

(56) References Cited

U.S. PATENT DOCUMENTS

| 5,880,767 A | * | 3/1999 | Liu ............................. 347/251 |
| 6,453,068 B1 | * | 9/2002 | Li ............................... 382/167 |
| 6,614,474 B1 | * | 9/2003 | Malkin et al. ................ 348/252 |

* cited by examiner

*Primary Examiner*—Thomas D Lee

(57) ABSTRACT

According to one aspect, there is provided a method of determining if pixel level values of a digital picture image can benefit from an adjustment in levels to enhance the edge appearance of the image. The method involves: (1) locating edges within the image; (2) determining pixel level values across found edges; (3) determining existing overshoot from the pixel level values found at step 2; and (4) determining, based on the overshoot magnitude, if an adjustment in pixel level values will be beneficial to the edge appearance of the image.

21 Claims, 7 Drawing Sheets

IMAGE SHARPENING

FIELD OF THE PRESENT INVENTION

This present invention relates generally to image sharpening and more particularly to a method that can be used to digitally enhance images.

BACKGROUND OF THE PRESENT INVENTION

Image enhancement is often undertaken to improve the quality, or emphasize particular aspects of, an acquired digital image. Image sharpening is one enhancement technique that emphasizes the edges of the subject within the image by high pass filtering the image. An edge in an image occurs where there is an abrupt change in intensity, or a discontinuity, between two regions within an image. Known image sharpening processes generally involve (1) detecting image edges in an acquired image array of gray-scale intensity pixel values and (2) sharpening the image by modifying pixels values of each detected edge.

Edge detection processing is a known technique and can be performed by calculating intensity gradients across the image. Gradient vectors calculated for first-order gradient operators, for example, yield the gradient magnitude and angle of the local intensity gradient at each pixel. Calculating gradient vectors in this manner involves convolving the acquired image array with two weighted windows, one giving the x Cartesian component of the gradient and the other giving the y Cartesian component (see Awcock G. W. and Thomas R., "*Applied Image Processing*", McGraw Hill, Chapter 4, 1996). The calculated gradient magnitudes are low in value in uniform intensity regions of the image, and high in value in regions containing edges (i.e. where there is a non-uniform intensity region). The occurrence of a high gradient magnitude value, indicating a sudden intensity transition, is evidence of an edge discontinuity at that pixel, the edge being at a normal to the calculated gradient angle.

Image sharpening involves increasing the image contrast in the local vicinity of image edges by modifying pixel values of edge pixels. When an edge separates a darker region from a lighter region, for example, and higher pixel values are indicative of lighter pixel intensities, image sharpening may be undertaken by decreasing the pixel values of pixels that are adjacent to, and on the darker side of the edge. Similarly, pixel values would be simultaneously increased for pixels that are adjacent to, but on the lighter side of the edge. The resulting increase in contrast in the local vicinity of edges is often referred to as overshoot.

Unsharp masking is a well known image sharpening technique and is often incorporated into photo manipulation software such as the well known Adobe Photoshop (Trade Mark) or other equivalents, for enabling users to sharpen acquired images. This sharpening technique involves adding the second derivative (i.e. Laplacian) of an original image array, to that original image array, which produces a sharpened image array. Manual adjustment of the degree of sharpening can be performed by multiplying a "sharpening factor" by the second derivative, and subsequently adding the result to the original image pixel values. In this way, a higher sharpening factor results in a greater degree of sharpening and therefore higher contrast around the edges of the sharpened image.

Image sharpening can be undertaken automatically to known levels by an image acquisition means such as a photocopier, image scanner, digital camera or other like image acquisition means containing the appropriate software, or alternatively, it can be undertaken manually on a digital processing apparatus such as a personal computer (PC) using appropriate software after the image has been acquired.

Problems can occur when images are sharpened too much because excessive contrast can occur at the image edges thereby resulting in image "clipping" and/or "ringing" as a consequence of excessive overshoot of pixel level values at the edges. These over-sharpening effects are often readily discernible by the human eye. The actual amount of sharpening that can ideally be performed depends on a number of factors related to: the image acquisition including lighting conditions, the contrast in the original scene, the optical system through which the image was acquired, and the conditions under which the image is to be viewed including the resolution and the gamma of the monitor used to produce the image display. The eye of the viewer is usually the best judge of the correct amount of sharpening.

SUMMARY OF THE PRESENT INVENTION

According to one aspect, there is provided a method of determining if pixel level values of a digital picture image can benefit from an adjustment in levels to enhance the edge appearance of the image. The method involves: (1) locating edges within the image; (2) determining pixel level values across found edges; (3) determining existing overshoot from the pixel level values found at step 2; and (4) determining, based on the overshoot magnitude, if an adjustment in pixel level values will be beneficial to the edge appearance of the image.

BRIEF DESCRIPTION OF THE DRAWINGS

Examples of the invention will now be described in relation to the accompanying drawings wherein.

DETAILED DESCRIPTION OF THE EMBODIMENTS

According to a first example, there is provided a method of determining if pixel level values of an acquired digital picture image can benefit from adjustment in levels to enhance the edge appearance of the image. The digital picture image has an array of gray-scale intensity pixel values acquired using a digital camera, photocopier or other suitable acquisition means. The array may be of the whole of the acquired image or may be only a part of the acquired image.

Figure 1:
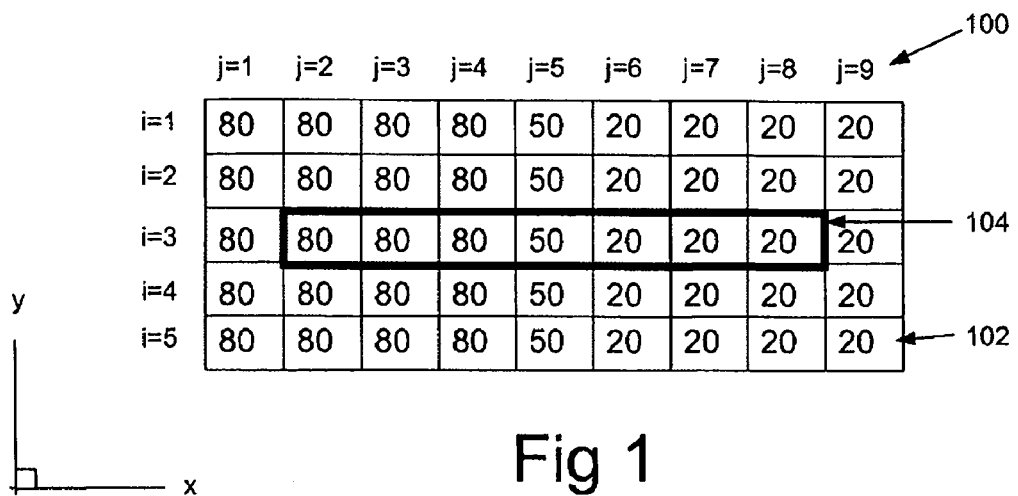
FIG. 1 is a schematic diagram of an image array of gray scale intensity pixel values for a first example in accordance with an embodiment of the present invention.

FIG. 1 shows an image array 100 of forty-five pixel values 102 having five pixel rows (i) and nine pixel columns (j). Three different pixel values 80, 50 and 20 are contained in the image array 100. Edge detection can be implemented using a first-order gradient operator for a continuous function f(x,y) which is given by:

$$G(f) = \frac{df}{dx} \cdot \vec{i} + \frac{df}{dy} \cdot \vec{j} \quad (1)$$

where x and y are Cartesian axes, and $\vec{i}$ and $\vec{j}$ are unit vectors in the y and x directions respectively.

The magnitude $G_m(i,j)$ and angle $G_\phi(i,j)$ of the gradient vector at each pixel (i,j) can be calculated as follows:

$$G_m(i,j) = \sqrt{G_x^2(i,j) + G_y^2(i,j)} \quad (2)$$

$$G_\phi(i,j) = \tan^{-1}(G_y(i,j)/G_x(i,j)) \quad (3)$$

where $$G_x(i,j) = W_x * n(i,j) \quad (4)$$

$$G_y(i,j) = W_y * n(i,j) \quad (5)$$

and where n(i,j) is some neighborhood of pixel values centred at location (i,j), * represents the digital convolution calculation, and $W_x$ and $W_y$ represent gradient window operators for the x and y components respectively.

Image edges are detected or located by comparing the calculated gradient vector magnitudes with a pre-determined threshold. Pixels having a corresponding gradient magnitude greater than or equal to the pre-determined threshold are edge pixels whereas those pixels having a corresponding gradient magnitude less than the pre-determined threshold are not considered edge pixels useful in this example.

The foregoing edge detection process is well known in the art and is detailed in numerous references including Awcock G. W. and Thomas R., "*Applied Image Processing*", McGraw Hill, Chapter 4, 1996. Commonly used gradient window operators include Prewitt and Sobel operators that use 3×3 filter masks. The following 3×3 filter masks were found to generally yield good results:

$$W_x = \begin{bmatrix} -1 & -2 & -1 \\ 0 & 0 & 0 \\ 1 & 2 & 1 \end{bmatrix} \quad (6)$$

$$W_y = \begin{bmatrix} -1 & 0 & 1 \\ -2 & 0 & 2 \\ -1 & 0 & 1 \end{bmatrix} \quad (7)$$

Figure 2:
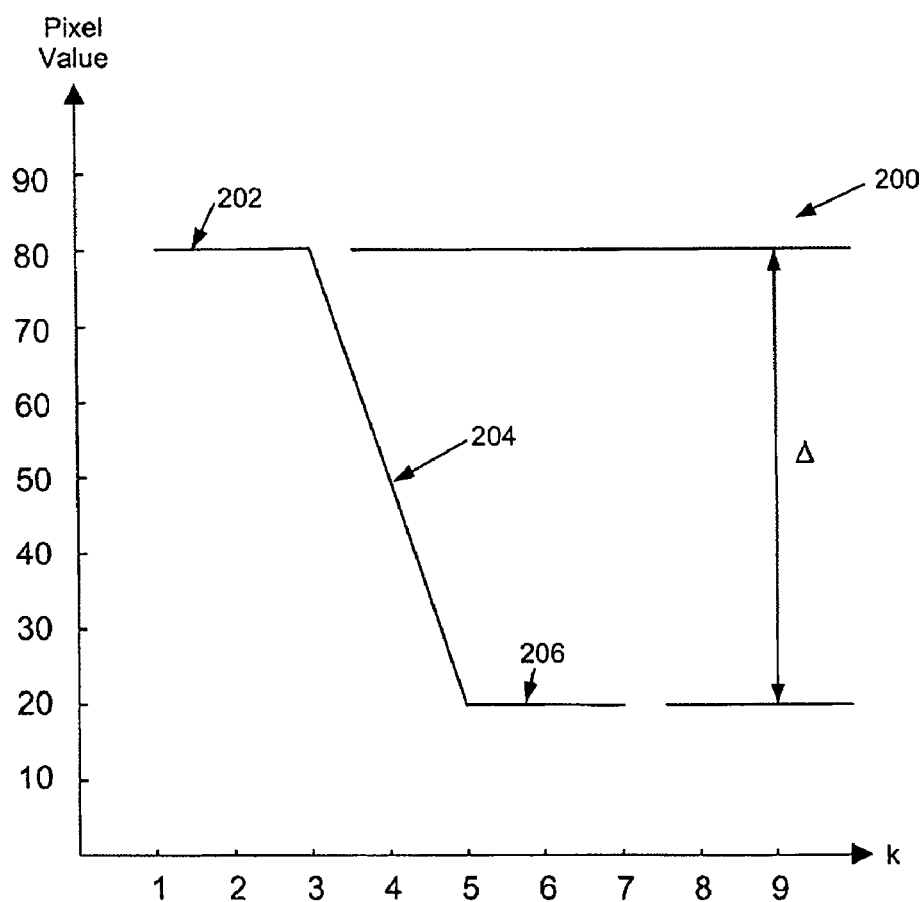
FIG. 2 is a plot of pixel values versus pixel value position number for a 1D window of the image array of FIG. 1 in accordance with an embodiment of the present invention.

There is a one dimensional (1D) window 104 or slice of seven connected pixels (i.e. k=1 . . . 7) in length centred at edge pixel (i=3, j=5) in the image array 100. The 1D window 104 is aligned at a normal to an edge in the image. Plotting the pixel values against the pixel window position number k yields the curve 200 of FIG. 2 in which the edge is clearly visible. This edge can be readily detected using the foregoing detection process and is, in this case, a high-to-low edge characterized by a high flat region 202, a primary transition region 204 representing the transition at the edge, and a low flat region 206. It is apparent that the numbering of k is arbitrary and, if reversed, a low-to-high edge would result having the same characteristics.

Figure 3:
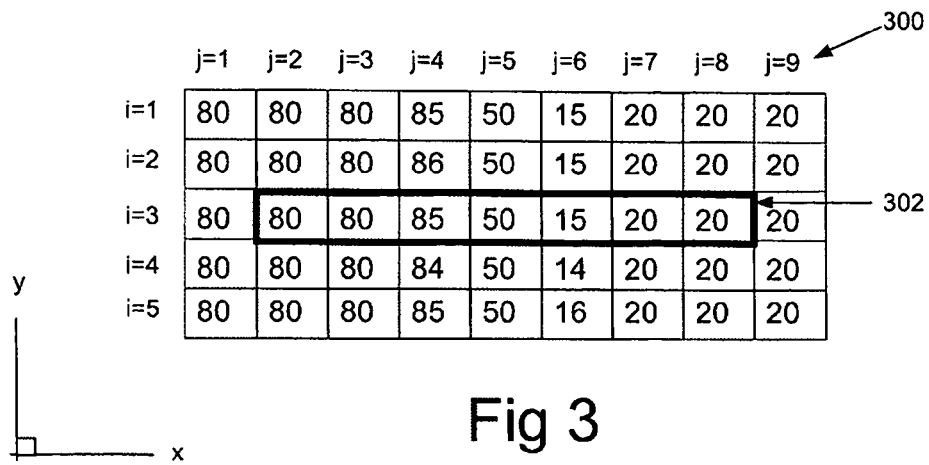
FIG. 3 is a schematic diagram of a sharpened image array of the image array of FIG. 1, according to a first example of an embodiment of the present invention.

The image array 100 of FIG. 1 can be sharpened using unsharp masking or other like known sharpening techniques to produce the sharpened image array 300 of FIG. 3 wherein each edge, occurring in a different row i, has been sharpened to approximately the same extent. Pixel values at j=4 and j=6 have been changed to increase the contrast between those pixel values in any given row i. Plotting the pixel values of the sharpened image against the pixel window position number k, for row i=3, again yields a graph 400 in which an edge is clearly visible (FIG. 4) having a high flat region 402, a primary transition region 404 and a low flat region 406.

The center pixel of the 1D window 302 is the edge pixel located at k=4 which corresponds to j=5. The primary transition region 404 is defined by the monotonically decreasing pixel value sequence including the center pixel (i.e. k=3 . . . 5). The flat regions 402, 406 are each defined by an unbroken sequence of pixel values, on either side of the primary transition region 404, wherein the pixel values as compared to pixels in their respective immediate vicinities exhibit low variation. In addition, there is a high overshoot 408 and a low overshoot 410 which have resulted from the sharpening process. The high overshoot 408 is defined as the highest pixel value in the primary transition region 404 (i.e. k=3) and the low overshoot 410 is defined as the lowest pixel value in the primary transition region 404 (i.e. k=5).

The regions between the flat regions 402, 406 and the primary transition region 404 are defined as a secondary transition regions 412. The secondary transition regions 412 contain no pixel values in the present example, however, they may include pixels situated between the flat regions 402, 406 and the primary transition region 404 whose pixel values do not satisfy the afore-mentioned criteria for defining either a flat region 402, 406 or a primary transition region 404. That is, if a pixel situated between the high flat region 402 and the primary transition region 404 has an associated value which cannot be considered to form part of the high flat region 402 or the primary transition region 404, it is assessed as forming part of the secondary transition region 412.

Figure 4:
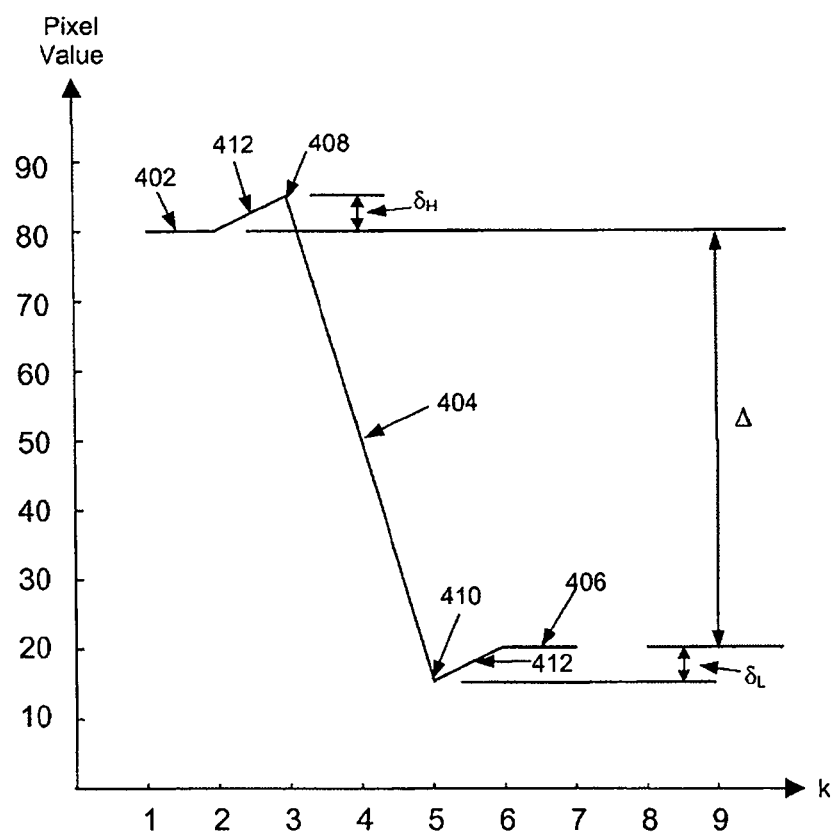
FIG. 4 is a plot of pixel values versus pixel value position number for a 1D window of the sharpened image array of FIG. 3 in accordance with an embodiment of the present invention.

The values of pixel levels in the graph of FIG. 4 are therefore one way of identifying similarity to a known pattern of pixel level values for transition edges. Pixel level values for edges that do not exhibit this similarity can therefore be disregarded or ignored.

The normalized high overshoot ($OS_H$) can be calculated as a ratio between the high overshoot ($\delta_H$), and the difference between the high flat region 402 and the low flat region 406 ($\Delta$) as follows:

$$OS_H = \frac{\delta_H}{\Delta} \quad (8)$$

A similar expression for the normalized low overshoot ($OS_L$) is as follows:

$$OS_L = \frac{\delta_L}{\Delta} \quad (9)$$

Although the normalized overshoots $OS_H$ and $OS_L$ are normally of a similar value, as is the case in the present example, they may differ significantly and therefore an average normalized overshoot percentage (OS) can be calculated as follows:

$$OS = \frac{OS_H + OS_L}{2} \times 100\% \quad (10)$$

Table 1 indicates the average normalized overshoot percentage OS calculated for each of the five sharpened edges of FIG. 3 in accordance with Eqs. 8 to 10. The average of the average normalized overshoot percentage (OS) for the image is 8.3%. This average is used as an indicator of the extent to which the image has been sharpened and can therefore serve as an indicator of how much further sharpening should be performed.

TABLE 1

Normalized overshoot results for FIG. 3.

| i | $OS_H$ (%) | $OS_L$ (%) | OS (%) |
|---|---|---|---|
| 1 | 8.3 | 8.3 | 8.3 |
| 2 | 10.0 | 8.3 | 9.2 |
| 3 | 8.3 | 8.3 | 8.3 |
| 4 | 6.7 | 10.0 | 8.3 |
| 5 | 8.3 | 6.7 | 7.5 |
|  |  | Average | 8.3 |

Typically, there are distinct bands in which the average OS can be compared to make an assessment with regard to further enhancement such as sharpening. For example, the following four bands may be applied to the average of the average normalized overshoot percentage (OS) wherein:

(I) OS<15% means that there has been little or no sharpening to the image and therefore further sharpening may be applied;

(II) 15%≦OS<25% means that there has been some sharpening to the image and some further sharpening may be applied;

(III) 25%≦OS<35% means that there has been substantial sharpening to the image and further sharpening is not required; and (IV) OS≧35% means that the image has been over-sharpened and some un-sharpening/blurring of the image can be applied.

In the present example, the average normalized overshoot percentage (OS) is 8.3% which means that further sharpening of the image may be applied in accordance with band I.

Sharpening involves using, for example, the known unsharp mask, so that the overshoot of the edges in the image can be increased or, if the image has been oversharpened, decreased (i.e. un-sharpening or as otherwise known "blurring"). In practice a "look-up table" can be implemented to provide set amounts of adjustment for sharpening (or blurring) the image by comparing the average OS value with the respective bands. Accordingly, it can be seen that the bands enable a determination to be made to assess whether the digital image can benefit from an adjustment such as further sharpening, blurring, or indeed no sharpening if it is determined the image is at an optimum sharpened level.

The first example as described above is a greatly simplified example compared with assessing the degree of sharpening that has been applied to an actual image taken, for example by a digital camera, where there may be many millions of pixel values, although the same basic principles apply.

Figure 5:
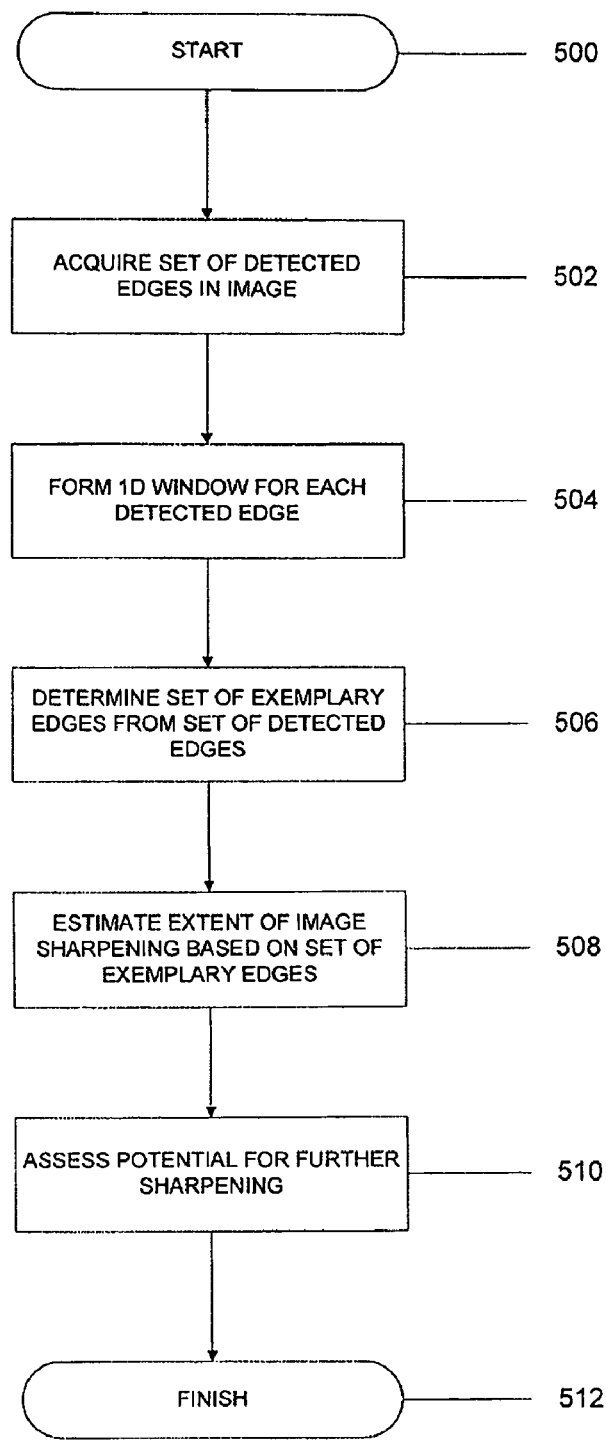
FIG. 5 is a flowchart outlining the basic steps for determining to which extent a digital image should be sharpened in accordance with an embodiment of the present invention.
Figure 6:
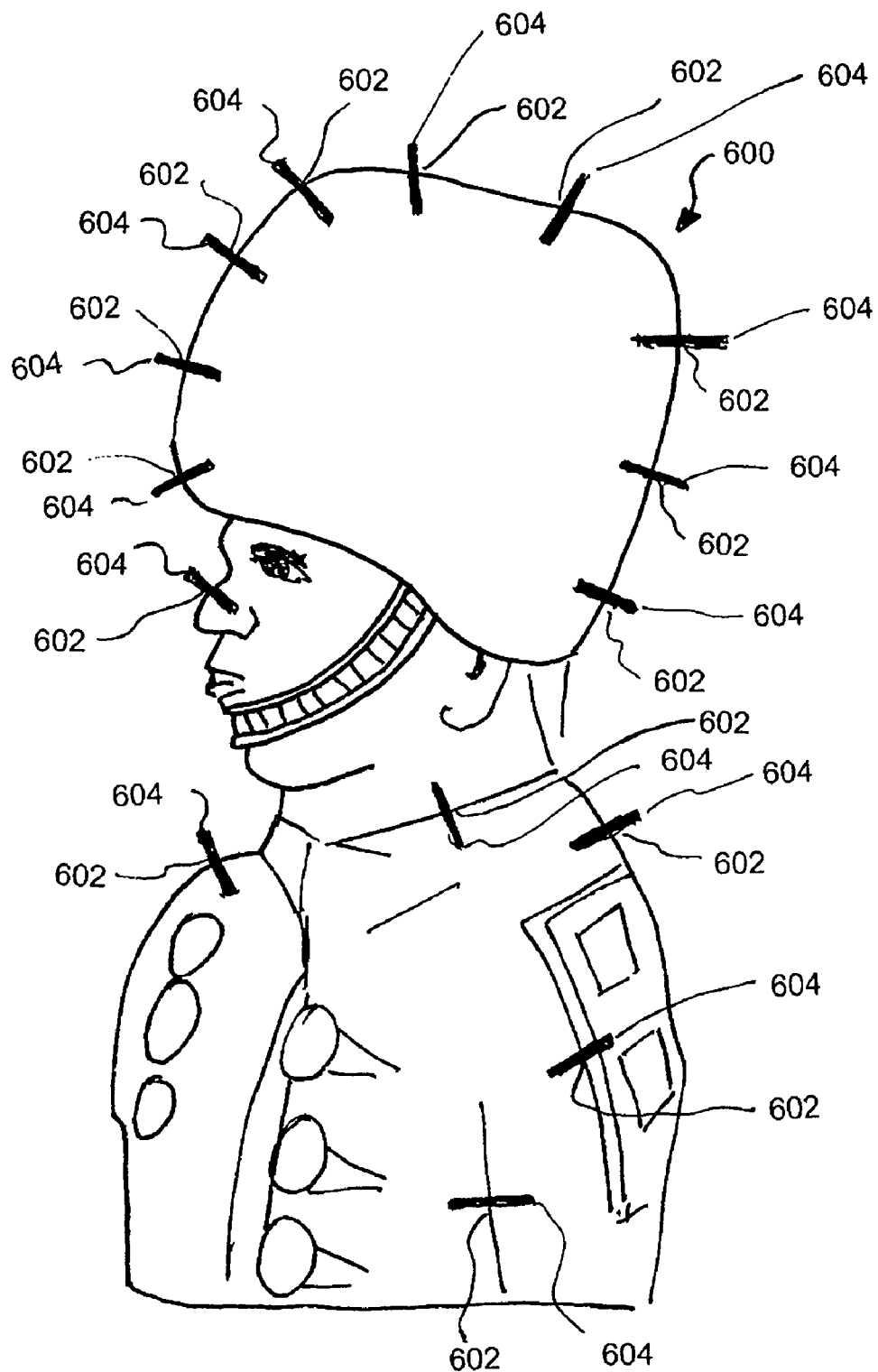
FIG. 6 is a gray-scale digital picture image (drawn as a line drawing) on which an assessment may be performed for determining to which extent a digital image should be sharpened, in accordance with an embodiment of the present invention.

The flowchart of FIG. 5 outlines the basic steps for determining the extent to which a digital image may be sharpened based upon the extent to which the image has already been sharpened. This flow chart will be explained according to a second example, where there is provided a 512×768 pixel gray-scale image 600 (FIG. 6) starting at step 500. The digital image 600 has a corresponding image array of gray-scale intensity pixel values analogous to those shown in the first example. FIG. 6 is a line drawing of a picture image, to aid clarity, rather than using the actual picture image where reproduction in a patent specification may be difficult. The line drawing shows the outline of a human head carrying a helmet or hat.

The edge detection method defined by Eqs. 1 to 7, (using a first-order gradient operator), is used to identify the edges in the digital image 600 at step 502, so that a set of detected edges 602 in the image is acquired. The set of edges 602 is formed by pixels having a calculated gradient magnitude $G_m(i,j)$ which exceeds a pre-determined threshold. The pre-determined edge threshold is selected, in practice, such that a percentage (eg. 33%) of the total image pixels will have a gradient magnitude exceeding the pre-determined threshold.

Step 504 involves forming a one dimensional (1D) window 604 for each edge pixel detected. Each edge pixel is the center pixel of the 1D window 604 of twenty-one pixels (i.e. k=1…21). The 1D windows 604 are aligned with the calculated gradient vector angle $G_\phi(i,j)$ and are formed by twenty-one connected pixels having a consecutive pixel position k. In the first example, the 1D windows 104 are formed by horizontal pixels 102 only. In the second example, the equivalent 1D window 604 is aligned at a normal to the edge and may therefore be oriented at any angle. Hence, the pixels forming the window 604 may be oriented horizontally, vertically or diagonally to neighboring connected pixels.

Each 1D window 604 is formed by first obtaining the edge pixel (i.e. center pixel k=11) and then obtaining two equal-length sequences of ten neighboring pixels, one on either side of the center pixel, by stepping through the image array 600 in equal increments along the direction indicated by the gradient vectors $G_x$ and $G_y$.

The digital image 600 may have previously undergone unsharp masking, any other like sharpening process, or not been sharpened at all. Step 506 is performed to determine a set of exemplary edges, as assessed according to certain pre-determined exemplary edge criteria, from the set of detected edges acquired at step 502. Sets of pixel levels across the detected edges are defined by the 1D windows 604. Each of the detected edges is compared with the exemplary edge criteria and a determination is made for each 1D window 604 as to whether that edge is, in fact, an exemplary edge.

As previously discussed in relation to FIG. 4, an edge generally has a high flat region 402, a primary transition region 404 and a low flat region 406. The edge may further have secondary transition regions 412. A combination of these characteristics may be used at step 506 as pre-determined edge criteria for assessing whether an edge is exemplary thereby exhibiting similarity to a known pattern for transition edges. An example of how an exemplary edge may be determined is described in detail later with regard to FIG. 7. A set of exemplary edges is formed containing only those edges that meet the pre-determined edge criteria and all other edges are disregarded.

Step 508 involves assessing the extent to which the image has already been sharpened based on information in the set of exemplary edges determined at step 506. An analogous table to Table 1 can be formed for the second example using Eqs. 8 to 10, and an average of the average normalized overshoot percentage (OS) for the image can be calculated.

Step 510 is then performed to assess whether there is any potential for further image sharpening. This is determined by comparing the average normalized overshoot percentage (OS) obtained at step 508 with distinct bands as previously undertaken in the first example. Further sharpening can then be performed, if needed, at step 512 either manually or automatically.

Figure 7:
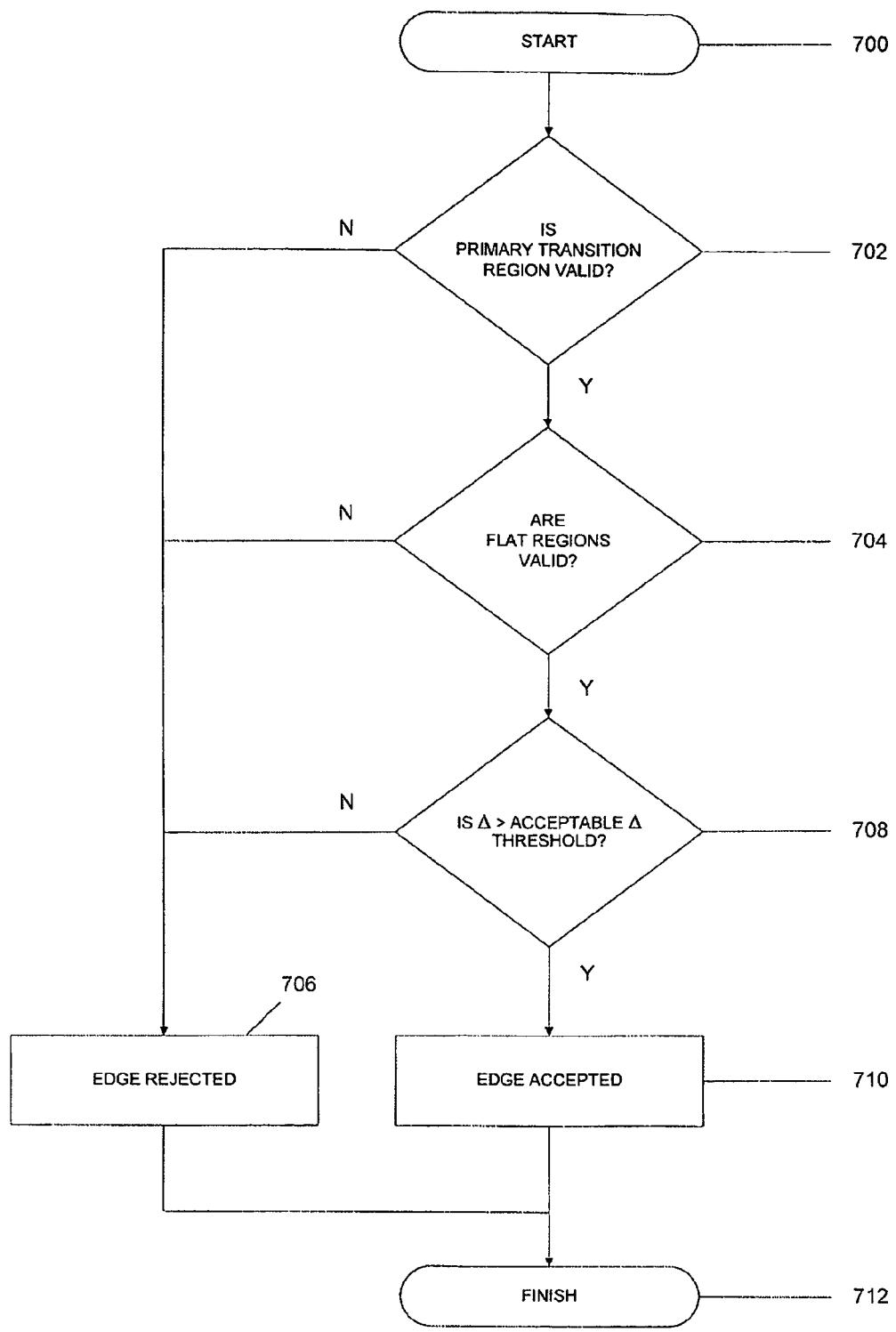
FIG. 7 is a flowchart outlining the basic steps for determining whether an edge can be classified as exemplary according to step 506 of FIG. 5 in accordance with an embodiment of the present invention.

An example of determining whether a single edge can be classified as exemplary in accordance with step 506 is outlined in the flowchart of FIG. 7. A description of this process is given as follows.

Figure 8:
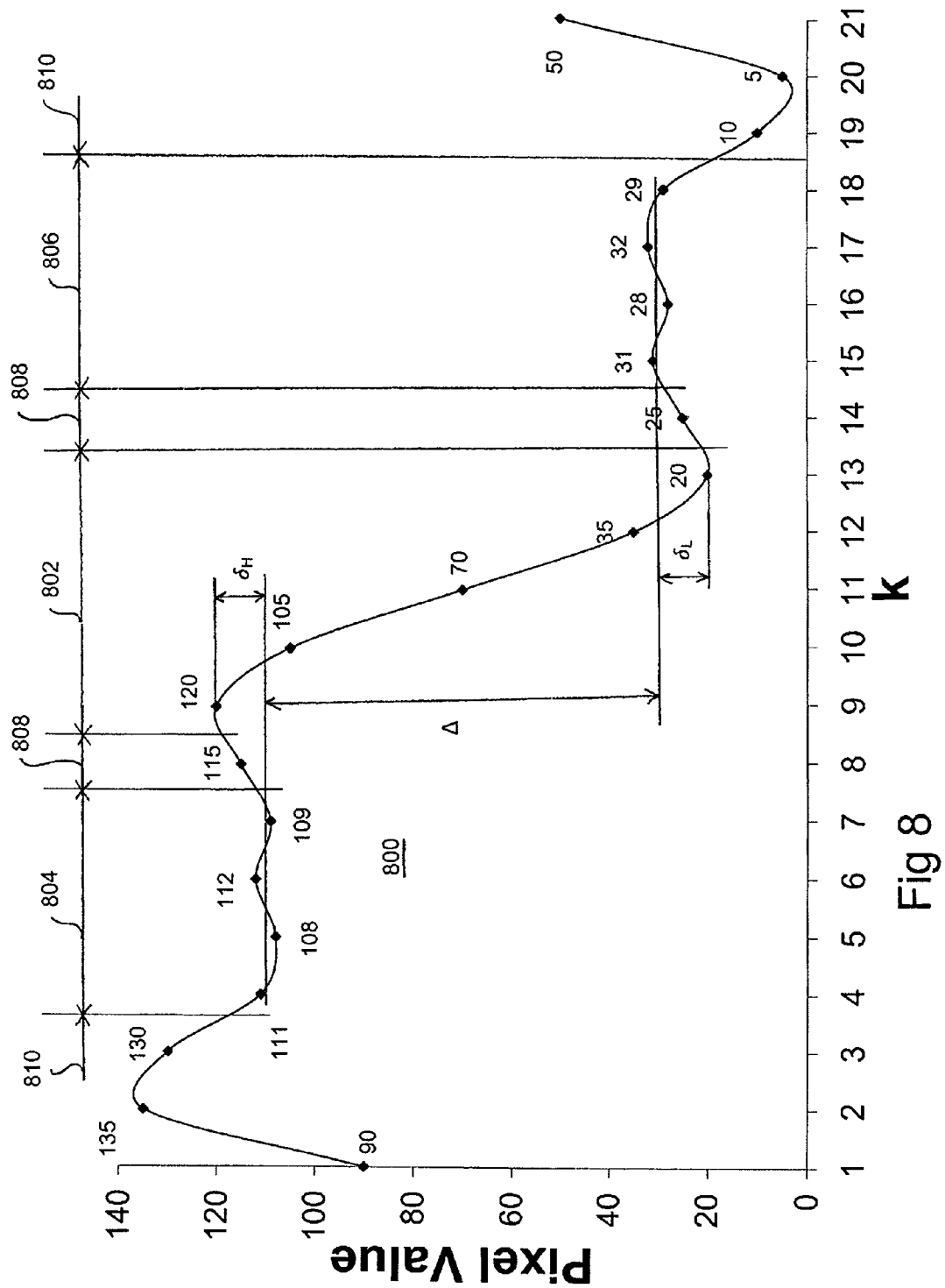
FIG. 8 is a schematic diagram of a realistic sharpened edge characteristic in accordance with an embodiment of the present invention.

A 1D window 604 of an arbitrary edge pixel 602 is considered at step 700. The plot of FIG. 4 for the first example was highly simplified and a more realistic example of the arbitrary edge is represented in FIG. 8. The present example therefore has a 1D window plot 800 having twenty-one pixels with a center pixel at k=11.

Steps 702 and 704 involve segmenting the 1D window 604 into regions to determine whether the edge has pre-determined regions. If the 1D window 604 does not exhibit these edge regions, the edge cannot be considered to be an exemplary edge and is rejected in accordance with step 706. For the present example, an edge having a primary transition region 802, and flat regions 804, 806 will satisfy steps 702 and 704 respectively, and based on consideration up to this point will not be rejected in accordance with step 706.

With regard to step 702, the primary transition region 802 is identified as the monotonically decreasing pixel value sequence including the center pixel (i.e. k=9 . . . 13). In practice, the primary transition region must contain at least two pixels or the edge will be rejected in accordance with step 706. There is a high overshoot which is defined as the highest pixel value in the primary transition region 802 (i.e. k=9) and a low overshoot which is defined as the lowest pixel value in the primary transition region 802 (i.e. k=13).

With regard to step 704, the flat regions 804, 806 are each defined by an unbroken sequence of pixel values, on either side of the primary transition region 802, wherein the pixel values exhibit low variation. For the present example, the first group of adjacent pixels immediately outside the primary transition region 802, when stepping away from the center pixel in either direction of k, which do not vary more than five pixel values from one another are regarded as forming a flat region 804, 806. Other metrics may be applied to the 1D window 604 to define the flat regions 804, 806 including left hand or right hand derivatives, or other like gradient metrics.

The high flat region 804 (i.e. k=4 . . . 7) and the low flat region 806 (i.e. k=15 . . . 18) both have a variation of four pixel values whereby the difference between the maximum and minimum pixel values in each region is four (eg. 112-108). In practice, an edge will be rejected in accordance with step 706 if the number of pixels in either flat region 804, 806 is less than or equal to the number of pixels in the primary transition region 802.

The regions between the primary transition region 802 and the flat regions 804, 806 are defined as a secondary transition regions 808 and, for the present example, include the two respective pixels at k=8 and k=14. The pixel values of these pixels do not satisfy the afore-mentioned criteria for defining either the primary transition region 802 or the flat regions 804, 806. The secondary transition regions 808 need not contain any pixels, as previously discussed.

The regions containing pixels on either distal side of the flat regions 804, 806, from the center pixel, are defined as disqualifying regions 810. The secondary transition regions 808 and disqualifying regions 810 are not used when determining an exemplary edge, for the present example, however may form the basis of additional pre-determined exemplary edge criteria for other embodiments.

The pixel values in the each of the flat regions 804, 806 are subject to variation and, in practice, are averaged when calculating the difference between the high flat region 804 and the low flat region 806 ($\Delta$) (i.e. 110−30=80). The high overshoot ($\delta_H$) is calculated by subtracting the average value of the high flat region 804 from the maximum pixel value in the primary transition region 802 (i.e. 120−110=10). Similarly, the low overshoot 805 ($\delta_L$) is calculated by subtracting the minimum pixel value in the primary transition region 802 from the average value of the low flat region 806 (i.e. 30−20=10).

Step 708 involves checking whether $\Delta$ is greater than an acceptable pre-determined threshold. That is, if $\Delta$ is less than or equal to the pre-determined threshold, the edge is rejected at step 706. When the pixel values in the image range in value from 0 to 255, a suitable value for the pre-determined threshold of the second example is 64 and as $\Delta$=80 in the present example, the edge would be accepted according to step 710.

If the conditions of steps 702, 704, and 708 are met, the edge is considered to be exemplary and is therefore accepted according step 710. Rejected edges determined from step 706 are disregarded at step 712, whereas accepted edges according to step 710 are added to the set of exemplary edges for further processing at step 508.

Figure 9:
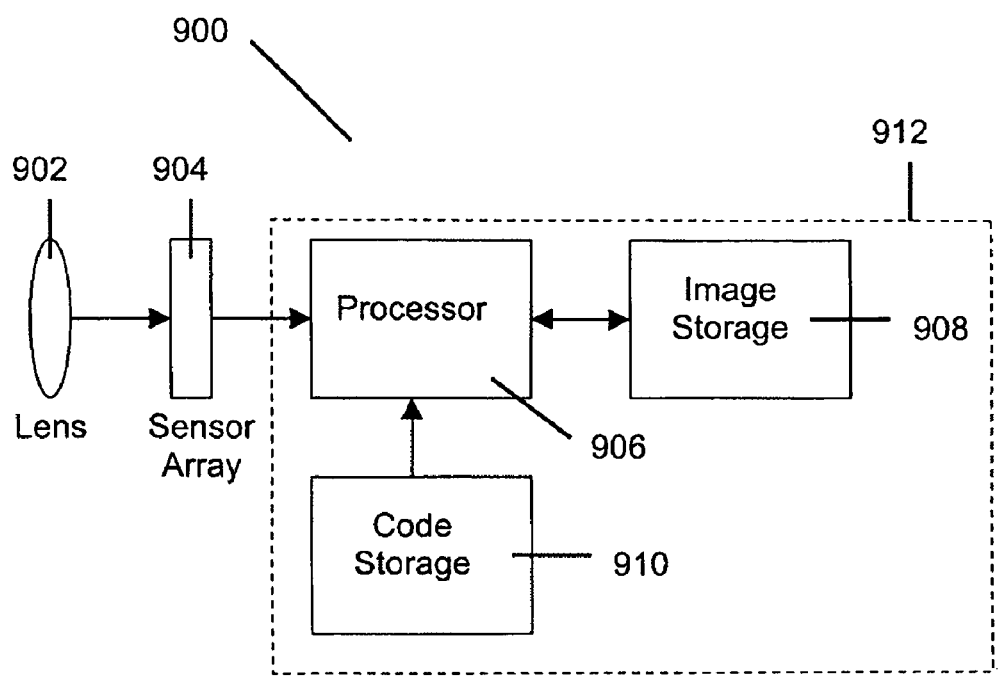
FIG. 9 is a schematic diagram of a black-and-white photocopier that could be utilized in conjunction with an embodiment of the present invention.

FIG. 9 shows a block circuit schematic diagram of a photocopier 900 that may typically be used to acquire a digital image. Light passes through a lens 902, onto a sensor array 904, and sensor readings are digitized by a processor 906 to form an image array which is stored in the image storage medium 908. A code storage medium 910 stores the software which controls the processor 906. An internal processing system 912 comprising the processor 906, code storage medium 910 and image storage medium 908 can subsequently determine the extent to which the digital image may be sharpened based upon the extent to which the image has already been sharpened, and sharpen the image accordingly.

The steps of determining the extent to which the digital image may be sharpened can alternatively be performed by the processor 906 prior to storing the modified image array in the image storage medium 908.

In a further example, the stored image may be transferred from the photocopier image storage medium 908 to a personal computer (PC) containing suitable processing system software. The PC can therefore be used to determine the extent to which the digital image may be sharpened, based upon the extent to which the image has already been sharpened. The PC user can subsequently sharpen the image manually as needed. Typically, the software for this processing can form part of image processing software supplied on a data storage medium to the PC for processing.

Whilst a photocopier has been given as an example of an image acquisition means, it should be appreciated that the image can be acquired by any convenient means such as by a digital camera, by a scanner, by a file data exchange or by a connection with the Internet or like communication medium, and the invention is not to be limited to use with only photocopiers.

Other variations and/or modifications of the foregoing examples will be apparent to those skilled in the art. For example, an alternative operator to the first-order gradient operator such as a second-order gradient operator or a compass operator, could readily be used when detecting edges in the digital image.

The examples above describe processing a digital picture image having a corresponding array of gray-scale intensity pixel values. The examples are also suitable for color image processing wherein the gray-scale array is initially formed by extracting the gray-scale component (e.g. a luminance or brightness component) for each color pixel in the image. After an assessment has been made regarding the extent of image sharpening needed, based upon the processed gray-scale array, the extracted gray-scale array can be sharpened further, if needed, and then substituted to replace the gray-scale components initially extracted from the color image.

In addition, the overshoot calculation of examples involved taking averages of the high and low overshoots of the sharpened image, however, in alternative examples only a single overshoot need be considered.

The criteria used when assessing whether an edge is exemplary may be subject to much variation. For example, a sharpened edge may only need to exhibit a primary transition and a single overshoot to be considered an exemplary edge. The overshoot values $\delta_H$ and $\delta_L$ are typically positive, however, may in practice be negative.

Similarly, an additional step could be introduced into the flowchart of FIG. 7 to assess whether secondary transition regions 808 have acceptable characteristics. In another example, an edge having a secondary transition region on the high side of the edge with a value less than the average value between the high and low flat regions 804, 806 could be rejected according to step 706. In addition, if the number of pixels in a secondary transition region 808 were to meet or exceed the number of pixels forming the primary transition region 802, the edge could also be rejected according to step 706.

In another example, the number of exemplary edges would be compared with a pre-determined threshold at step 508 of FIG. 5 to determine whether a reliable estimation of the degree of sharpening that has occurred to the image can be made.

These and other modifications may be made without departing from the ambit of the invention, the nature of which is to be determined from the foregoing description.

The invention claimed is:

1. A computer-implemented method of processing an image of image forming elements each of which has at least one respective value, comprising:
    detecting edges within the image;
    for each of one or more of the detected edges,
        computing a first value from values of ones of the image forming elements in a first region on a first side of the edge,
        computing a second value from values of ones of the image forming elements in a second region on a second side of the edge, and
        determining across the edge a respective transition region that is between the first region and the second region and comprises a respective set of ones of the image forming elements with values that transition from the first value to the second value;
    for each of one or more of the transition regions, calculating a respective overshoot value indicative of an amount by which one or more of the values of the image forming elements in the transition region overshoot at least one of the first and second values;
    ascertaining an enhancement potential of the image based on one or more of the overshoot values; and
    enhancing the image in response to an evaluation of the enhancement potential the image.

2. A method as claimed in claim 1, wherein the determining comprises selecting each of one or more of the detected edges based on a respective comparison of a distribution of the values of the respective ones of the image forming elements across the detected edge to a known pattern for transition edges; and the calculating comprises calculating the respective ones of the overshoot values only for the selected ones of the detected edges.

3. A method as claimed in claim 1, wherein the detecting comprises applying a first-order gradient operator to ones of the image forming element values to determine a respective gradient vector for each of the image forming elements, and detecting the edges based on comparisons of the gradient vectors with a threshold.

4. A method as claimed in claim 3, wherein an x component gradient window operator $W_x$ and a y component gradient window operator $W_y$, are used when determining the gradient vectors, the gradient window operators being $$W_x = \begin{bmatrix} -1 & 2 & -1 \\ 0 & 0 & 0 \\ 1 & 2 & 1 \end{bmatrix} \text{ and } W_y = \begin{bmatrix} -1 & 0 & 1 \\ -2 & 0 & 2 \\ -1 & 0 & 1 \end{bmatrix}.$$

5. A method of determining if pixel level values of a digital picture image can benefit from an adjustment in levels to enhance the edge appearance of the image comprising the steps of:
    (1) locating edges within the image;
    (2) determining pixel level values across found edges;
    (3) determining an average overshoot magnitude from the pixel level values determined at step 2, analyzing the pixel level values determined at step (2) to determine if they exhibit similarity to a known pattern for transition edges, determining a set of pixel level values that exhibit similarity to said known pattern, and processing at step (3) pixel level values for only edges that exhibit this similarity; and
    (4) determining, based on the overshoot magnitude, if an adjustment in pixel level values will be beneficial to the edge appearance of the image.

6. A method as claimed in claim 5 further comprising making an assessment of the adjustment in levels needed to enhance the edge appearance based on the determined average overshoot.

7. A method as claimed in claim 6 comprising providing bands of average overshoot, and respective adjustment levels needed to enhance the edge appearance based on the average overshoot, and determining which band is applicable to the determined average overshoot so as to determine the adjustment in levels applicable to provide an expected enhanced edge appearance.

8. A method as claimed in claim 7 wherein at least one band is applicable for providing an edge sharpening enhancement.

9. A method as claimed in claim 8 wherein at least one band is provided in which there will be no edge enhancement.

10. A method as claimed in claim 8 wherein at least one band is provided for providing an edge blurring enhancement.

11. A method as claimed in claim 7 comprising the further step of providing an enhancement of the edge appearance of the digital picture image based on the determined average overshoot.

12. A digital imaging processing apparatus for processing an image of image forming elements each of which has at least one respective value, the apparatus comprising:
a machine-readable storage medium storing machine process instructions; and
a machine processor operable to execute the machine process instructions and perform operations comprising
detecting edges within the image;
for each of one or more of the detected edges,
computing a first value from values of ones of the image forming elements in a first region on a first side of the edge,
computing a second value from values of ones of the image forming elements in a second region on a second side of the edge, and
determining across the edge a respective transition region that is between the first region and the second region and comprises a respective set of ones of the image forming elements with values that transition from the first value to the second value;
for each of one or more of the transition regions, calculating a respective overshoot value indicative of an amount by which one or more of the values of the image forming elements in the transition region overshoot at least one of the first and second values;
ascertaining an enhancement potential of the image based on one or more of the overshoot values; and
enhancing the image in response to an evaluation of the enhancement potential the image.

13. A digital imaging processing apparatus as claimed in claim 12, wherein in the determining the machine processor performs operations comprising selecting each of one or more of the detected edges based on a respective comparison of a distribution of the values of the respective ones of the image forming elements across the detected edge to a known pattern for transition edges, and in the calculating the machine processor performs operations comprising calculating the respective ones of the overshoot values only for the selected ones of the detected edges.

14. A digital imaging processing apparatus as claimed in claim 13, wherein in the detecting the machine processor performs operations comprising:
applying a first-order gradient operator to ones of the image forming element values to determine a respective gradient vector for each of the image forming elements, and comparing a magnitude of each gradient vector with a pre-determined threshold to locate edges; and
detecting the edges based on comparisons of the gradient vectors with a threshold.

15. A digital imaging processing apparatus as claimed in claim 14, wherein in the detecting the machine processor uses an x component gradient window operator $W_x$ and a y component gradient window operator $W_y$ when determining the gradient vectors, the gradient window operators being $$W_x = \begin{bmatrix} -1 & 2 & -1 \\ 0 & 0 & 0 \\ 1 & 2 & 1 \end{bmatrix} \text{ and } W_y = \begin{bmatrix} -1 & 0 & 1 \\ -2 & 0 & 2 \\ -1 & 0 & 1 \end{bmatrix}.$$

16. A digital imaging processing apparatus as claimed in claim 13, wherein in the determining the machine processor performs operations comprising identifying each of the transition regions based on similarity of the respective distribution of the values of the image forming elements in the respective set to the known pattern, and in the ascertaining the machine processor performs operations comprising determining an average of ones of the overshoot values and ascertaining the enhancement potential of the image based on the average overshoot value.

17. A computer-readable medium storing computer-readable instructions for processing an image of image forming elements each of which has at least one respective value, the computer-readable instructions being operable to cause a computer to perform operations comprising:
detecting edges within the image;
for each of one or more of the detected edges,
computing a first value from values of ones of the image forming elements in a first region on a first side of the edge,
computing a second value from values of ones of the image forming elements in a second region on a second side of the edge, and
determining across the edge a respective transition region that is between the first region and the second region and comprises a respective set of ones of the image forming elements with values that transition from the first value to the second value;
for each of one or more of the transition regions, calculating a respective overshoot value indicative of an amount by which one or more of the values of the image forming elements in the transition region overshoot at least one of the first and second values;
ascertaining an enhancement potential of the image based on one or more of the overshoot values; and
enhancing the image in response to an evaluation of the enhancement potential the image.

18. A computer-readable medium as claimed in claim 17, wherein in the determining the computer-readable instructions cause the computer to select each of one or more of the detected edges based on a respective comparison of a distribution of the values of the respective ones of the image forming elements across the detected edge to a known pattern for transition edges, and in the calculating the computer-readable instructions cause the computer to calculate the respective ones of the overshoot values only for the selected ones of the detected edges.

19. A computer-readable medium as claimed in claim 18, wherein in the determining the computer-readable instructions cause the computer to perform operations comprising identifying each of the transition regions based on similarity of the respective distribution of the values of the image forming elements in the respective set to the known pattern, and in the ascertaining the computer-readable instructions cause the computer to perform operations comprising determining an average of ones of the overshoot values and ascertaining the enhancement potential of the image based on the average overshoot value.

20. A computer-readable medium as claimed in claim 17, wherein in the detecting the computer-readable instructions cause the computer to perform operations comprising:
applying a first-order gradient operator to ones of the image forming element values to determine a respective gradient vector for each of the image forming elements; and
detecting the edges based on comparisons of the gradient vectors with a threshold.

21. A computer-readable medium as claimed in claim 20, wherein in the detecting the computer-readable instructions cause the computer to use an x component gradient window operator $W_x$ and a y component gradient window operator $W_y$ when determining the gradient vectors, the gradient window operators being $$W_x = \begin{bmatrix} -1 & 2 & -1 \\ 0 & 0 & 0 \\ 1 & 2 & 1 \end{bmatrix} \text{ and } W_y = \begin{bmatrix} -1 & 0 & 1 \\ -2 & 0 & 2 \\ -1 & 0 & 1 \end{bmatrix}.$$

* * * * *

UNITED STATES PATENT AND TRADEMARK OFFICE
CERTIFICATE OF CORRECTION

| | | |
|---|---|---|
| PATENT NO. | : 7,522,314 B2 | Page 1 of 1 |
| APPLICATION NO. | : 10/742532 | |
| DATED | : April 21, 2009 | |
| INVENTOR(S) | : C. Brian Atkins | |

It is certified that error appears in the above-identified patent and that said Letters Patent is hereby corrected as shown below:

On the face page, in field (75), in "Inventor", in column 1, line 1, delete "Brian C. Atkins" and insert -- C. Brian Atkins --, therefor.

In column 10, line 20, in Claim 1, after "potential" insert -- of --.

In column 10, line 26, in Claim 2, delete "edges;" and insert -- edges, --, therefor.

In column 10, line 37, in Claim 4, delete "$W_y$," and insert -- $W_y$ --, therefor.

In column 11, line 47, in Claim 12, after "potential" insert -- of --.

In column 12, line 49, in Claim 17, after "potential" insert -- of --.

Signed and Sealed this

Seventeenth Day of November, 2009

David J. Kappos
*Director of the United States Patent and Trademark Office*